(12) United States Patent
Rode

(10) Patent No.: US 12,407,160 B2
(45) Date of Patent: Sep. 2, 2025

(54) DRIVING CIRCUIT FOR A PIEZOELECTRIC ULTRASONIC TRANSDUCER AND ULTRASONIC TRANSDUCER SYSTEM

(71) Applicant: Pepperl+Fuchs SE, Mannheim (DE)

(72) Inventor: Mark Heinrich Ewald Rode, Lampertheim (DE)

(73) Assignee: Pepperl+Fuchs SE, Mannheim (DE)

( * ) Notice: Subject to any disclaimer, the term of this patent is extended or adjusted under 35 U.S.C. 154(b) by 261 days.

(21) Appl. No.: 18/128,031

(22) Filed: Mar. 29, 2023

(65) Prior Publication Data

US 2023/0330704 A1    Oct. 19, 2023

(30) Foreign Application Priority Data

Apr. 19, 2022   (EP) ..................................... 22168796

(51) Int. Cl.
*H02H 3/20*       (2006.01)
*H02M 3/156*    (2006.01)

(52) U.S. Cl.
CPC ............. *H02H 3/20* (2013.01); *H02M 3/156* (2013.01); *B06B 2201/40* (2013.01); *B06B 2201/55* (2013.01)

(58) Field of Classification Search
CPC ..... H02H 3/20; H02M 3/156; B06B 2201/40; B06B 2201/55; B06B 1/0215; B06B 1/06; G01S 7/524; G01S 15/88; G01S 7/521

(Continued)

(56) References Cited

U.S. PATENT DOCUMENTS 3,982,425 A * 9/1976 McLain ................ B06B 1/0215
                                                     73/635
5,347,495 A * 9/1994 Cherek .................... G01S 7/526
                                                     367/87

(Continued)

FOREIGN PATENT DOCUMENTS

CN   111585444 A * 8/2020 .............. H02M 1/32
DE     3618222 A1    12/1987

(Continued)

OTHER PUBLICATIONS

Extended European Search Report mailed Oct. 14, 2022 in European patent application No. 22168796.5, 6 pages.

*Primary Examiner* — Dharti H Patel
(74) *Attorney, Agent, or Firm* — Blueshift IP; Robert Plotkin

(57) ABSTRACT

The invention refers to a driving circuit (2) for a piezoelectric ultrasonic transducer (4) in an ultrasonic transducer system (1), comprising: a transformer (21) having at least one primary-side winding (22, 22', 22"); a switching unit having a semiconductor switch (24', 24") connected to the at least one primary-side winding (22, 22', 22") via a switched connection (A', A"); and, a control unit (5) which is configured to alternately apply an operating voltage ($U_B$) to the at least one primary-side winding (22, 22', 22") or to disconnect it therefrom, a protection circuit (25) which is electrically coupled to the switched connection (A', A") and which has a Zener diode (ZD1) which limits a switch-off voltage at the switched connection (A', A") in terms of magnitude to a limiting voltage ($U_G$) which corresponds to at least twice the operating voltage.

8 Claims, 2 Drawing Sheets

(58) Field of Classification Search
USPC .......................................................... 361/91.1
See application file for complete search history.

(56) References Cited

U.S. PATENT DOCUMENTS

| | | | | |
|---|---|---|---|---|
| 6,069,800 | A * | 5/2000 | Cross | H02M 1/4258 |
| | | | | 363/40 |
| 2006/0007711 | A1 * | 1/2006 | Yang | H02M 3/33571 |
| | | | | 363/17 |
| 2015/0194876 | A1 * | 7/2015 | Larosa | H02M 3/33523 |
| | | | | 363/21.15 |
| 2017/0099011 | A1 * | 4/2017 | Freeman | H02M 7/06 |
| 2018/0034270 | A1 * | 2/2018 | Jutras | H02J 50/001 |
| 2021/0220871 | A1 | 7/2021 | Axman | |

FOREIGN PATENT DOCUMENTS

| | | | | |
|---|---|---|---|---|
| DE | 102006054095 | A1 | | 5/2008 |
| DE | 102014108532 | A1 * | 12/2015 | ........ H02M 3/33569 |
| EP | 2189808 | B1 | | 3/2013 |
| SU | 1700713 | A1 * | 12/1991 | |

* cited by examiner

DRIVING CIRCUIT FOR A PIEZOELECTRIC ULTRASONIC TRANSDUCER AND ULTRASONIC TRANSDUCER SYSTEM

FIELD OF THE INVENTION

The present invention relates to driving circuits for piezoelectric ultrasonic transducers with improved protection against overvoltages due to switching operations on transformer inductors.

TECHNICAL BACKGROUND

Ultrasonic transducers are used for object detection, and usually have a piezoelectric actuator which requires a high electrical AC voltage of about 100 V to 200 V for excitation. The voltage level of such a driving voltage is usually provided by voltage transformation using a transformer in the output stage.

In the transmission mode, a periodic pulsed operating voltage is applied to the transformer on the primary side, which is correspondingly transformed up to the desired driving voltage. For reasons of a simpler circuit design, the excitation is pulse-shaped. For the pulse-shaped excitation of such a transformer, a provided operating voltage is switched on or off on the primary side. The pulsed excitation of the transformer results in a relatively high switch-off voltage due to the electrical energy stored in the inductance of the transformer winding on the primary side. This effect is also called the flyback effect.

The high switch-off voltage on the primary side of the transformer resulting from the flyback effect needs to be limited in order to prevent damage to components of the driving circuit. Usually, the energy of the primary-side inductance is dissipated via diodes, and is dissipated as power loss in the form of heat.

Ultrasonic transducer systems usually control the ultrasonic transducer alternately in a transmission mode to emit an ultrasonic transmission signal, and in a reception mode to receive an ultrasonic reception signal corresponding to an ultrasonic transmission signal reflected from one or more surrounding objects. Resulting ultrasonic signal propagation times, among other features, are evaluated to obtain information about surrounding objects within the detection range of the ultrasonic transducer system. When switching from the transmission mode to the reception mode, it is necessary to completely dissipate the energy stored on the primary side as quickly as possible in order to provide the sensitivity at the beginning of the reception mode as quickly as possible after the end of the transmission mode. The establishment of the detection capability after the end of the transmission phase decisively determines up to which distance in the close range surrounding objects can be detected by the ultrasonic transducer system.

It is an object of the present invention to provide a driving circuit for an ultrasonic transducer and an ultrasonic transducer system that is more efficient and provides improved performance for detecting surrounding objects in the close range.

SUMMARY OF THE INVENTION

This problem is solved by the driving circuit for an ultrasonic transducer according to claim 1, and by the ultrasonic transducer system according to the independent claim.

Further embodiments are described in the dependent claims.

According to a first aspect, a driving circuit for a piezoelectric ultrasonic transducer in an ultrasonic transducer system is provided, comprising:
  a transformer having at least one primary-side winding;
  a switching unit having a semiconductor switch connected to the at least one primary-side winding via a switched connection; and
  a control unit which is configured to alternately apply an operating voltage to the at least one primary-side winding or to disconnect it therefrom,
  a protection circuit which is electrically coupled to the switched connection and which has a Zener diode which limits a switch-off voltage at the switched connection in terms of magnitude to a limiting voltage which corresponds to at least twice the operating voltage.

It may be provided that the limiting voltage is selected from a range between 100% and 150% of the magnitude of twice the operating voltage, in particular between 105% and 130% of the magnitude of twice the operating voltage.

Furthermore, the limiting voltage may be determined by selecting a starting voltage or breakdown voltage of the Zener diode.

Preferably, the protection circuit may be electrically coupled to the at least one switched connection in a non-capacitive fashion.

In a driving circuit for an ultrasonic transducer, a transformer is provided for a transmission mode in order to be able to drive the ultrasonic transducer, which is configured in particular as a piezo actuator, with correspondingly high driving voltages. This is performed by using an alternating voltage, which is usually provided by a pulsed operating voltage on the primary side of the transformer. The pulsed operating voltage is generated by applying or switching off an operating voltage, in particular by using suitable semiconductor switches, such as field-effect transistors or the like.

Due to the inductance of the at least one primary-side winding of the transformer, a considerable voltage rise occurs at the switched transformer terminal when the operating voltage is switched off due to the electrical energy stored in the inductance. The voltage rise can lead to damage or destruction of components of the ultrasonic transducer system. Therefore, a suitable protection circuit is usually provided to limit the voltage rise after the primary-side winding is switched off.

Immediately after the primary-side winding of the transformer has been switched off, the switched transformer terminal will normally have double the operating voltage because the potential of the corresponding other transformer terminal of the primary-side winding is not switched and is thus held constant. Without further measures, the switch-off voltage across the primary-side winding would now continue to rise due to the electrical energy stored in the winding, if a current flow from the primary-side winding is strongly limited or even prevented.

According to the above driving circuit, the protection circuit is therefore coupled to the switched connection of the at least one primary-side winding and comprises a Zener diode. The starting voltage (breakdown voltage) of the Zener diode is designed to be minimally above twice the operating voltage with which the primary-side winding is switched. By setting the starting voltage of the Zener diode to a value above twice the operating voltage, a rise in the switch-off voltage across the primary-side winding above a voltage threshold defined by the starting voltage is efficiently prevented. In this way, it is possible that, firstly, the voltage across the primary-side winding is limited to protect the other components, and, secondly, this voltage is selected just in such a way to ensure an optimum energy dissipation in interaction with the surrounding components.

Due to the specific drain of the current in the switch-off phase by means of the protection circuit, less electrical energy remains in the transformer during the transition from transmission mode to reception mode, so that the swing-out process at the end of transmission mode is significantly shortened. Any ultrasonic reception signal received by the ultrasonic transducer can thus be detected in an improved manner, since the ultrasonic reception signal is not superimposed, or is superimposed only for a shorter period of time by any swing-out signal after the end of the transmission mode.

It can be provided that the operating voltage is buffered by a buffer capacitance, the protection circuit being coupled to the buffer capacitance via a leakage resistor. In this way, a charge reservoir can be provided for a high switch-on current required at the start of the switch-on process of the primary-side winding. This return of the energy dissipated during switch-off to the supply circuit makes it possible to reduce the current demand of the driving circuit.

Furthermore, the protection circuit can be coupled to the at least one switched connection via a diode, in particular directly via a diode, which, when a voltage difference occurs between the at least one switched connection and the Zener diode, causes a charge flow from or to the at least one switched connection to limit a voltage change at the at least one switched connection.

Thus, the protection circuit can be decoupled by connecting in series with a diode so that the capacitance input of the protection circuit to the switched transformer terminal or to the primary-side winding of the transformer is reduced. In addition, the diode connected in series allows the Zener diode to be biased so that its switching inertia is minimized.

It can further be provided that a storage capacitance is electrically connected in parallel with the Zener diode to supplement the capacitance of the Zener diode. This enables improved intermediate storage of the electrical energy dissipated after the primary-side winding is switched off, which can be used for the next switching cycle, i.e., the next time the primary-side winding is switched on. By deliberately selecting the starting voltage of the Zener diode to be higher than twice the operating voltage, the resulting current flow through the primary-side winding can flow into the storage capacitance when the switch-off voltage rises. This continues until the breakdown voltage of the Zener diode is reached. The current flow then continues into the Zener diode until the breakdown voltage falls below the Zener diode again. At the same time, however, the extended flow also results in a rise in secondary-side voltage.

The storage capacitance is particularly useful in conjunction with the diode provided in series with the protection circuit, which decouples the protection circuit from the transformer winding. Thus, the diodes serve to decouple the capacitance formed by the Zener diode and the storage capacitance from the transformer circuit, and to apply a bias voltage that increases the switching speed.

In addition, the capacitance to absorb the dissipating charge is increased so that the capacitance of the Zener diode no longer significantly influences the switching speed, but at the same time enables storage of the energy flowing back out of the transformer. The energy stored in this capacitance can then be fed back into the charge reservoir of the buffer capacitance by means of the leakage resistor.

According to an embodiment, the transformer can have two primary-side windings that are alternately connected to and disconnected from the operating voltage so that the operating voltage is always supplied to only one of the primary-side windings.

The corresponding switched connections of the primary-side windings can be connected in particular to the protection circuit via a respective diode.

According to a further aspect, an ultrasonic transducer system is provided comprising:
a piezoelectric ultrasonic transducer;
the above driving circuit, wherein a secondary-side winding of the transformer is connected to the ultrasonic transducer.

BRIEF DESCRIPTION OF THE DRAWINGS

Embodiments are explained in more detail below with reference to the accompanying drawings, wherein.

DESCRIPTION OF EXEMPLARY EMBODIMENTS

Figure 1:
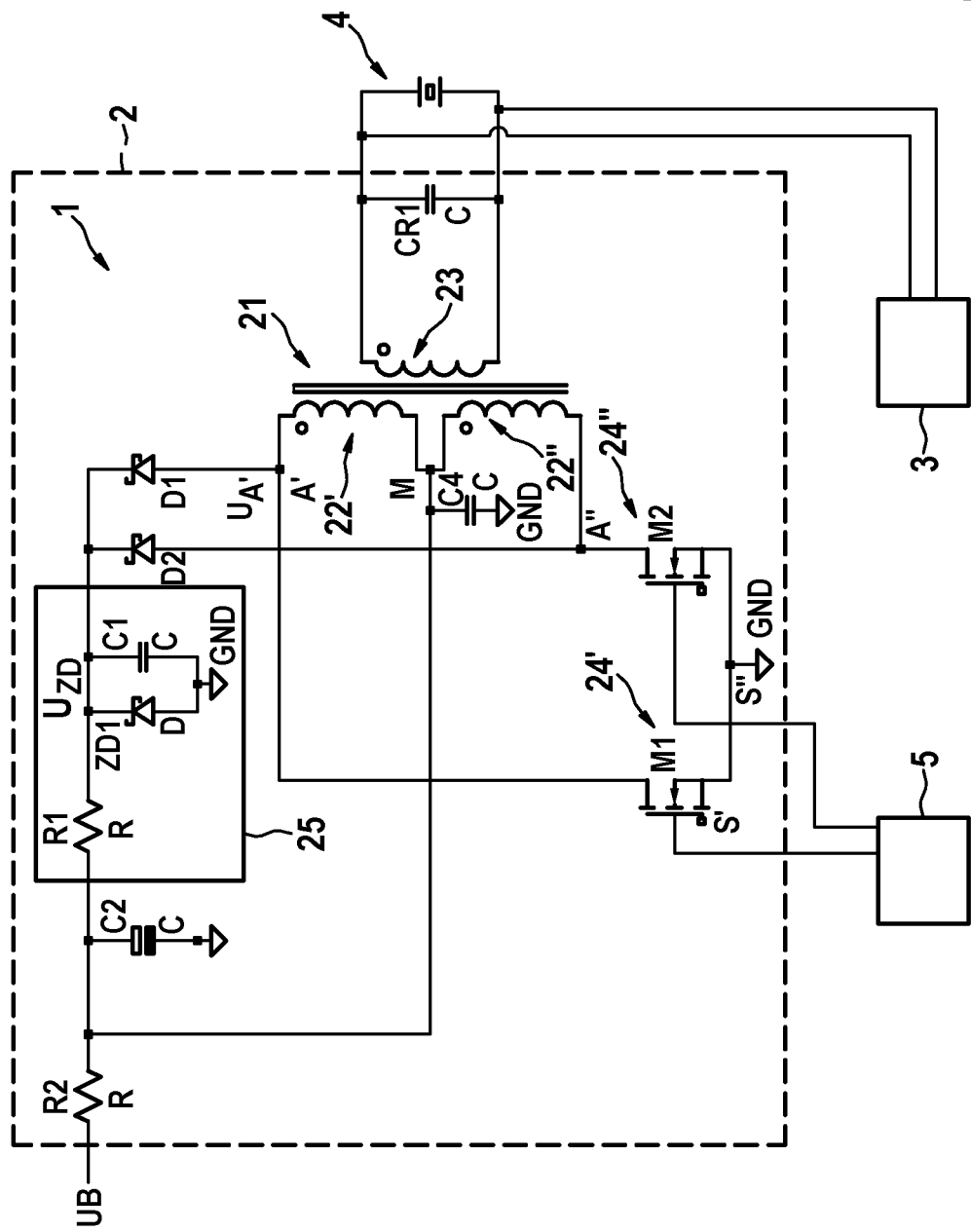
FIG. 1 shows a schematic representation of a circuit diagram of an ultrasonic transducer system including a driving circuit.

FIG. 1 shows an ultrasonic transducer system 1 including a driving circuit 2 for a transmission mode of the ultrasonic transducer system 1, and a reception circuit 3 for a reception mode of the ultrasonic transducer system 1. The driving circuit 2 and the reception circuit 3 are connected to an ultrasonic transducer 4. The reception circuit 3 is shown only schematically, and no further details of its actual design are given herein.

The ultrasonic transducer 4 has a piezo actuator that can be driven with high piezo voltages between 100 and 200 V in an ultrasonic frequency range to emit an ultrasonic transmission signal in the transmission mode. In a reception mode, an ultrasonic reception signal that is produced by a reflection of the ultrasonic transmission signal from one or more surrounding objects leads to a change in capacitance that can be detected in the reception circuit 3.

The driving circuit 2 and the reception circuit 3 are generally operated in an alternating transmission and reception mode via a control unit 5.

The driving circuit 2 comprises a transformer 21 which is coupled on the secondary side to the ultrasonic transducer 4.

The transformer 21 has two primary-side windings 22 and one secondary-side winding 23. The primary-side windings 22 are alternately energized with a pulsed operating voltage in each case, which corresponds to the desired driving frequency of the emitted ultrasonic transmission signal. The primary-side windings 22 are interconnected with a common center terminal M, which is connected to a first supply potential $U_B$ (operating voltage). In particular, the coupling to the first supply potential $U_B$ can be done via a resistor R2 and a capacitor C4 which provides a capacitance with respect to a second supply potential GND, in particular a ground potential.

A first switched connection A' of the first of the primary-side windings 22' is connected to the second supply potential GND via a first semiconductor switch 24', and a second switched connection A" of a second of the primary-side windings 22" is connected to the second supply potential GND via a second semiconductor switch 24". The semiconductor switches 24', 24" are alternately actuated by means of the control unit 5 in accordance with the actuation frequency for opening or closing with a respective control signal S', S", so that alternately the first and the second primary-side winding 22', 22" are energized, wherein the respective other of the first and the second primary-side winding 22', 22" is disconnected from the operating voltage between the first supply potential $U_B$ and the second supply potential GND.

The secondary-side winding 23 is connected to the ultrasonic transducer 4, which can be buffered with a buffer capacitor CR1. Due to the high switching currents that occur when the operating voltage is applied to the primary-side windings 22', 22", the first supply voltage can be buffered with a buffer capacitance C2, which serves as a charge reservoir for high initial currents after the switch-on process of one of the primary-side windings 22', 22".

The switched connections A', A" of the first and second primary-side windings 22', 22" are connected to a protection circuit 25 via a respective diode D1 and D2. The forward directions of the diodes D1 and D2 correspond respectively to a positive voltage between the switched connections A', A" and the protection circuit 25.

The protection circuit 25 has a Zener diode ZD1 which is connected to the switched connection A', A" and to the second supply potential GND by means of the diodes D1 and D2. The starting voltage (breakdown voltage) $U_{ZD}$ of the Zener diode ZD1 corresponds to a voltage which is set to at least twice the operating voltage, in particular slightly more than twice the operating voltage, in particular between 100% and 150%, preferably between 105% and 130%, of twice the operating voltage. The starting voltage of the Zener diode thus defines a limiting voltage for the voltage at the switched connection A', A".

Due to the alternating operation of the primary-side windings 22', 22", a switch-off voltage or a cut-off potential is produced at the switched connection A', A" of the primary-side windings 22', 22" after the relevant semiconductor switch 24', 24" is switched off (opening of the respective semiconductor switch), which corresponds approximately to twice the potential of the first supply potential $U_B$ (referred to the second supply potential GND). The switch-off potential is applied to the protection circuit 25 by means of the diodes D1, D2 (minus the diode voltage). The limitation of the voltage rise for the primary-side windings 22', 22" of the transformer 21 or the electronic semiconductor switch (transistor, FET, . . . ) 24', 24" connected thereto is formed from the starting voltage $U_{ZD}$ of the Zener diode plus the diode forward voltage of the diodes D1 or D2. If the Zener diode ZD1 is used without the diodes D1 and D2, the limitation of the voltage rise is equal to the starting voltage of the Zener diode ZD1.

The protection circuit 25 limits the corresponding cut-off potential to the potential of the starting voltage of the Zener diode ZD1. Without the Zener diode ZD1, the cut-off potential would continue to rise because the stored electrical energy would cause a current flow through the primary-side winding 22', 22", which would act back on the first supply potential $U_B$, or which would lead to a sharp rise in the voltage at the corresponding switched connection A', A".

The Zener diode ZD1 limits the voltage rise to the operating voltage.

Preferably, a storage capacitor is connected in parallel to the Zener diode ZD1. The parallel connection increases the charge-storing capacitance, which takes over a part of the dissipating charge quantity from the switched-off primary-side winding 22', 22", and is charged up to a voltage level corresponding to the starting voltage of the Zener diode ZD1.

Via a leakage resistor R1, with which the protection circuit 25 is connected to the first supply potential $U_B$, the charge from the storage capacitance C1 can now be supplied to the first supply potential $U_B$, there in particular into the buffer capacitance C2, in order to provide the charge correspondingly to be available for the high initial current during a subsequent switching operation. In this way, the current requirement of the driving circuit 2 can be reduced, since part of the electrical energy discharged when the corresponding primary-side winding is switched off can be used for a corresponding subsequent switching operation with the required high initial current by storing it in the storage capacitance C1 and the buffer capacitance C2.

The diodes D1, D2 have the advantage that the capacitance of the Zener diode ZD1 and the optional storage capacitance C1 are decoupled from the switched connections A', A" so that their capacitance input to the switching of the transformer 21 is reduced. Secondly, the Zener diode of the protection circuit 25 is biased across the leakage resistor R1 so that its switching inertia is reduced. The diodes decouple this part of the protection circuit from the primary-side windings and enable this process of biasing.

The protection circuit 25 also allows that the electrical energy from the primary-side windings 22', 22" quickly dissipates, so that less electrical energy remains in the transformer 21, and, in particular, after the end of the transmission operation, the swinging out of the transformer-ultrasonic transducer combination can be shortened, which forms an oscillating circuit with the inductance of the secondary-side winding 23 and the capacitance of the piezo-actuator of the ultrasonic transducer 4. This improves the performance for detections of objects in the close range, since an ultrasonic reception signal is not superimposed by a still ongoing swinging out of the oscillating circuit formed.

Figure 2:
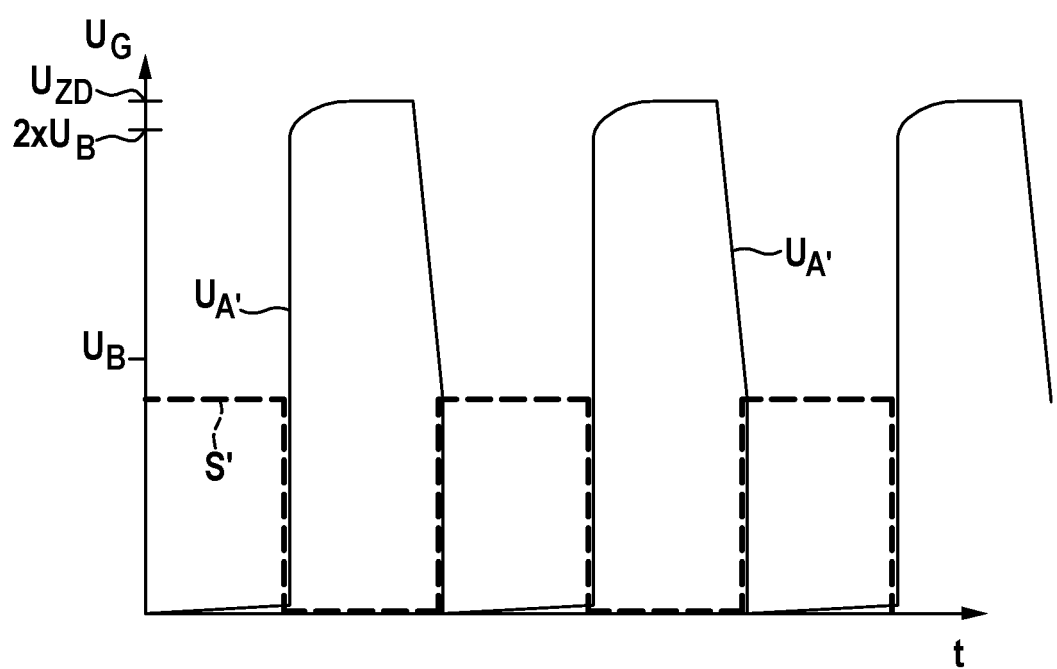
FIG. 2 shows a signal-time diagram of voltage signals of the driving circuit.

FIG. 2 shows a signal-time diagram to illustrate the operation of the driving circuit 2 for one of the switched connections A'. It can be seen that after the respective semiconductor switch 24' is turned off (controlled by a low level of the control signal S'), the voltage at the switched connection A' immediately rises to twice the operating voltage $2*U_B$, and then, due to the energy dissipation in the protection circuit 25, continues to rise up to the limiting voltage $U_G$ with decreasing current flow, and is held there until the energy stored in the transformer has been dissipated. The voltage at the switched connection A' subsequently collapses to $U_B$. The entire circuit should be configured in such a way that the voltage drop at the switched connection A' has occurred by the time the next pulse of the control signal S' is applied.

LIST OF REFERENCE SIGNS

1 ultrasonic transducer system
2 driving circuit
3 reception circuit
4 ultrasonic transducer
5 control unit
21 transformer
22, 22', 22" primary-side windings
23 secondary-side winding
24', 24" semiconductor switch
25 protection circuit
$U_B$ operating voltage, first supply potential
R1 leakage resistor R2 resistor
C1 storage capacitance
C2 buffer capacitance
C4 capacitor
GND second supply potential
A', A" switched connections
D1, D2 diodes
ZD1 Zener diode

The invention claimed is:

1. Driving circuit (2) for a piezoelectric ultrasonic transducer (4) in an ultrasonic transducer system (1), comprising:
    a transformer (21) having at least one primary-side winding (22, 22', 22");
    a switching unit having a semiconductor switch (24', 24") connected to the at least one primary-side winding (22, 22', 22") via a switched connection (A', A"); and
    a control unit (5) which is configured to alternately apply an operating voltage ($U_B$) to the at least one primary-side winding (22, 22', 22") or to disconnect it therefrom,
    a protection circuit (25) which is electrically coupled to the switched connection (A', A") and which has a Zener diode (ZD1) which limits a switch-off voltage at the switched connection (A', A") in terms of magnitude to a limiting voltage ($U_G$) which corresponds to at least twice the operating voltage,
    wherein the transformer (21) has two primary-side windings (22, 22', 22") which are being alternately connected to and disconnected from the operating voltage ($U_B$), so that the operating voltage ($U_B$) is constantly applied to one of the primary-side windings (22, 22', 22"), and
    wherein the corresponding switched connections (A', A") of the primary-side windings (22, 22', 22") are connected to the protection circuit (25), in particular via a respective diode (D1, D2).

2. Driving circuit according to claim 1, wherein the limiting voltage ($U_G$) is selected from a range between 100% and 150% of the magnitude of twice the operating voltage ($U_B$), in particular between 105% and 130% of the magnitude of twice the operating voltage.

3. Driving circuit according to claim 2, wherein the limiting voltage ($U_G$) is determined by selecting a starting voltage or breakdown voltage ($U_{ZD}$) of the Zener diode (ZD1).

4. Driving circuit (2) according to claim 3, wherein the protection circuit (25) is coupled to the at least one switched connection via a diode (D1, D2), in particular directly by means of the diode (D1, D2), which, when a voltage difference occurs between the at least one switched connection (A', A") and the Zener diode (ZD1), causes a charge flow from or to the at least one switched connection (A', A"), in order to limit a change in voltage at the at least one switched connection (A', A").

5. Driving circuit according to claim 4, wherein the protection circuit (25) is electrically coupled to the at least one switched connection (A', A") in a non-capacitive fashion.

6. Driving circuit according to claim 5, wherein the protection circuit (25) has a storage capacitance (C1) electrically in parallel to the Zener diode (ZD1).

7. Driving circuit according to claim 1, wherein the operating voltage is buffered by a buffer capacitance (C2), wherein the protection circuit (25) is coupled to the buffer capacitance (C2) via a leakage resistor (R1).

8. Ultrasonic transducer system (1), comprising:
    a piezoelectric ultrasonic transducer (4);
    a driving circuit (2) according to one of claims 1 to 7, wherein a secondary-side winding (23) of the transformer (21) is connected to the ultrasonic transducer (4).

* * * * *